Sept. 24, 1957

J. MIDDLEN 2,807,234

LIVESTOCK FEEDING APPARATUS

Filed Oct. 4, 1955

INVENTOR
Joel Middlen

BY Pierce, Scheffler & Parker

ATTORNEYS

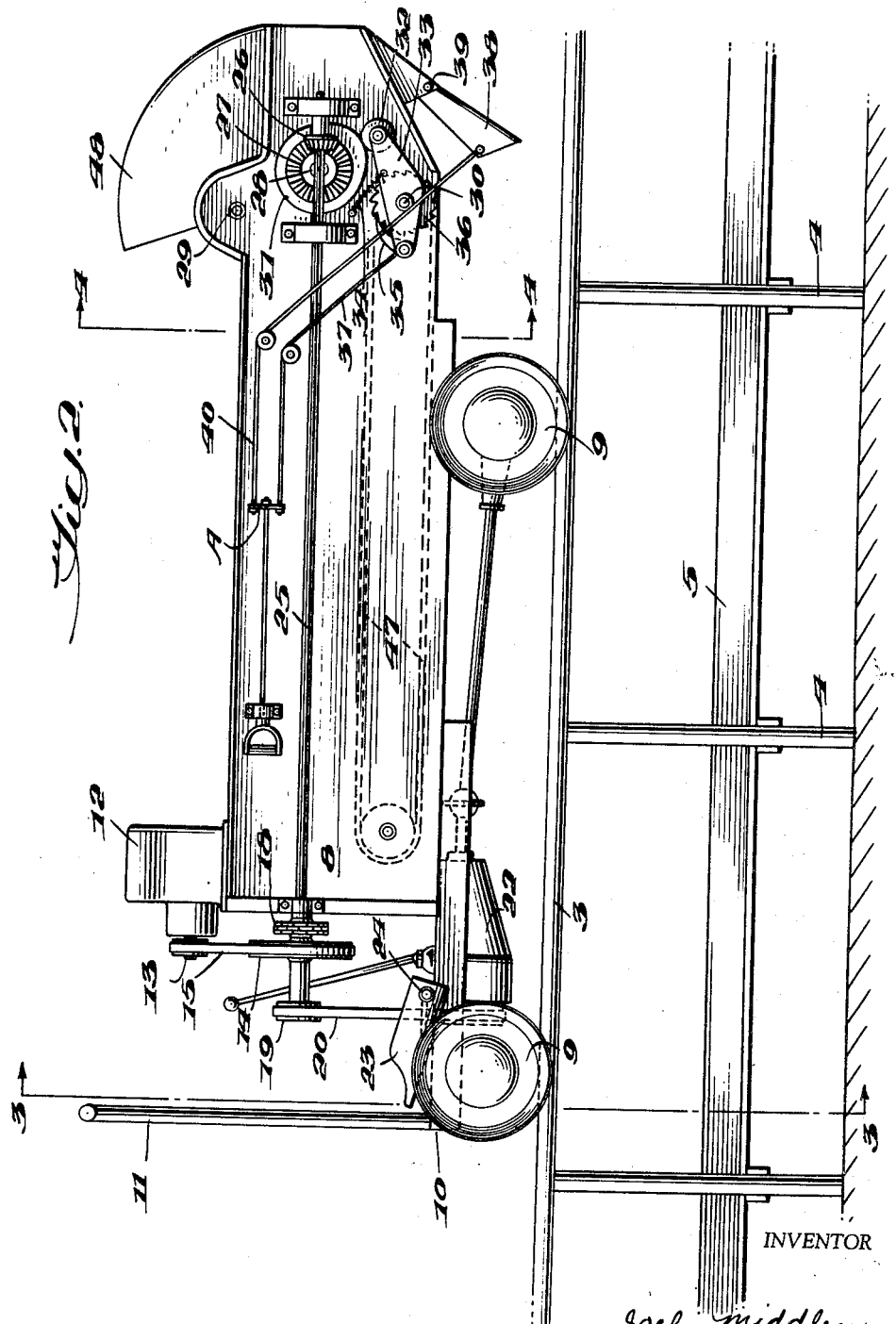

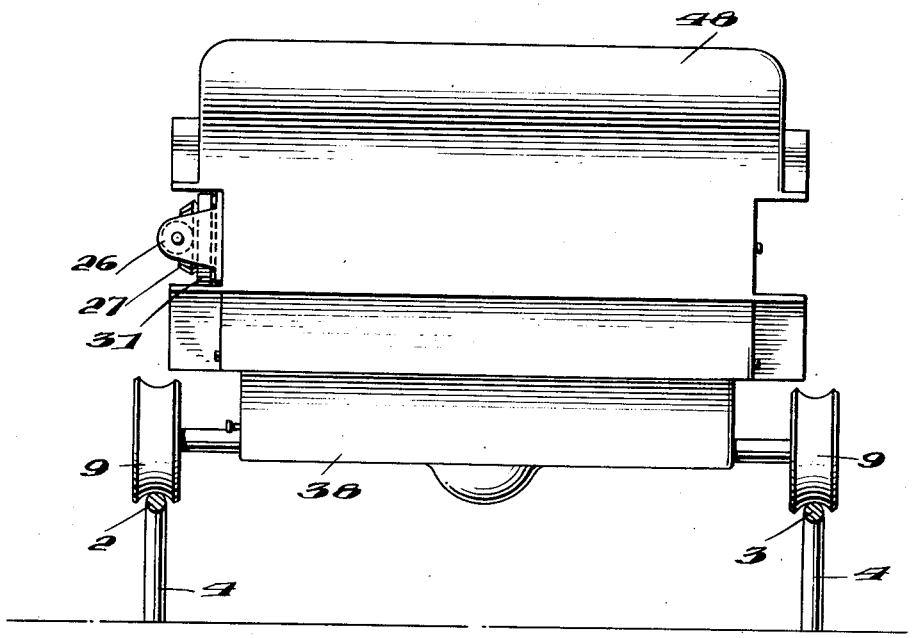
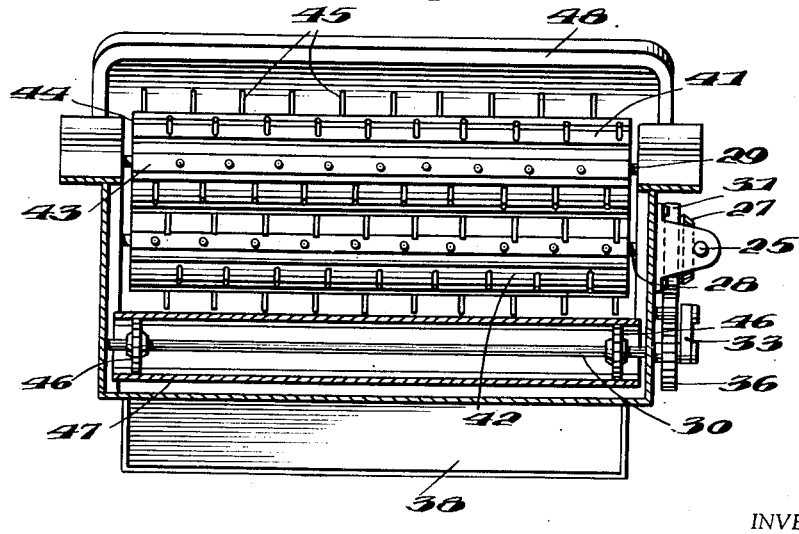

United States Patent Office 2,807,234
Patented Sept. 24, 1957

2,807,234

LIVESTOCK FEEDING APPARATUS

Joel Middlen, Larchwood, Iowa

Application October 4, 1955, Serial No. 538,393

3 Claims. (Cl. 119—51)

This invention relates to livestock feeding apparatus generally, and more particularly to livestock feeding apparatus in which the feed carrier travels on elevated tracks mounted above the cattle feed trough.

Various types of livestock feeding devices are well-known in the prior art. Semi-automatic devices have been developed to improve upon the manual feeding of cattle and to obviate the necessity of walking in the mud and snow along the side of cattle feed bunks. Several livestock feeding devices, of the type disclosed by the patents to Henderson #1,138,950 and Mattson #1,398,336, utilize the feature of tracks connecting the feed storage receptacle to the livestock feeding troughs, with a carriage adapted to travel on the tracks to deliver feed to the troughs. My invention provides a livestock feeding device which is an improvement over the well-known devices shown by the prior art.

An object of my invention is to provide a motive-powered livestock feeding device which travels on elevated rails from the feed storage receptacle to the cattle feed troughs.

A more specific object of my invention is to provide a livestock feeding device which will readily discharge cattle feed from an elevated position into a plurality of feeding troughs or bunks while the cattle are in eating position.

Another object of my invention is to provide feed mixing means in my livestock feeding device whereby the feed is thoroughly mixed before it is deposited in the feed trough.

A further object of my invention is to provide a motive-powered livestock feeding carriage travelling on elevated rails above the feeding troughs whereby feed may be automatically transported from the feed storage receptacles, mixed by rotary mixing means mounted in the feeding carriage, deposited in the livestock feeding troughs, and then the empty carriage may be automatically returned to the storage receptacles.

The various features of novelty which characterize my invention are pointed out with particularity in the claims annexed to and forming a part of this specification. For a better understanding of the invention, its advantages, and other specific objects obtained by its use, reference should be had to the accompanying drawings in which:

Figure 1 is a perspective view of my livestock feeding device;

Figure 2 is a side elevational view of the carriage showing the tracks elevated with respect to the trough;

Figure 3 is a sectional view of the carriage taken along line 3—3 of Figure 2;

Figure 4 is a sectional view of the carriage taken along line 4—4 of Figure 2;

Figure 5 is a rear elevational view of the carriage.

Referring now to Fig. 1, the livestock feeding carriage 1 is mounted upon tracks or rails 2 and 3 elevated by supports 4. Secured between the supports 4 below the tracks is the feeding trough 5 mounted above ground at the proper height for feeding the cattle 6. As seen from the figure, the carriage may travel from the feed storage receptacles 7 on the tracks mounted above the trough 5. Thus, as is further shown by Fig. 3, the cattle may feed from either side of the trough during the entire time that the device distributes the feed into the trough.

Referring now to Figures 2 and 3, the carriage 1 consists of the body 8 on a chassis supported from the tracks by wheels 9. The wheels may be provided with rubber liners for better friction with the elevated tracks. The carriage has a platform 10 with guard rail 11 upon which the operator stands while operating the device. Mounted upon the body is a motor 12 of the gas or electric type with standard hand clutch which provides power means for motivating the carriage along the track and for operating the rotary mixer mounted in the carriage. Power is transmitted from the motor output shaft 13 to pulley 14 by V-belt 15. Mounted upon the same shaft as the pulley 14 is sprocket gear 16, connected by chain 17 to sprocket gear 18. Pulley 19 similarly mounted on the same shaft as pulley 14 is connected by belt 20 to pulley 21 which is fastened to the carriage transmission 22. Brake members 23 cooperating with the front wheels are secured to the shaft 24 which is rotatably mounted on the body 8. The brakes are applied frictionally to the wheels by foot lever 25 secured to shaft 24.

Rotatably secured to the side of the body is power shaft 25 which transmits power to the rear portion of the vehicle for driving the mixers and the conveyor mechanism. Power shaft 25 is driven by chain 17 through sprocket gear 18. Gear 26 mounted on shaft 25 drives gear 27 which is secured to the lower mixer shaft 28 rotatably mounted in bearings in the body 8 transverse to the longitudinal axis of the carriage. An upper mixer shaft 29 and the conveyor drive shaft 30 are similarly rotatably mounted in the body. The upper mixer shaft 29 is driven by shaft 25 through suitable gearing means, not shown. The conveyor drive shaft 30 is driven by a ratchet drive off shaft 28 upon which is mounted cam 31. Roller follower 32 of cam 31 is mounted upon arm 33 which is rotatably mounted upon shaft 30. Spring 34 tends to urge roller follower 32 against the cam 31. Ratchet mechanism 35 mounted on the other end of arm 33 cooperates with gear 36 secured to shaft 30. Thus as the cam 31 operating through follower 32 causes oscillatory motion of arm 33, the ratchet mechanism cooperates with gear 36 to cause step-by-step rotation of conveyor power shaft 30. Cable 37 is attached to arm 33 near the ratchet mechanism 35. If the operator of the carriage applies tension to the cable shown partly at 37, roller follower 32 is removed from the cam 31 and power is removed from the conveyor power shaft.

A distributing pan 38 is pivotally secured to the body at pivot 39. The distributing pan may be raised or lowered as desired by the operator by the discharge linkage shown partly at 40. The pan actuating linkage 40 may be so connected with the roller follower cable controller 37, as shown generally at A, that raising the distributing pan to the closed position will disconnect power to the conveyor power shaft 30.

Referring now to Figure 4, the upper and lower mixers, shown generally at 41 and 42, are mounted upon shafts 29 and 28 respectively, which are mounted in bearings in the body 8. The mixers consist of a plurality of bars 43 secured to the supporting members 44 attached to the shaft. Striker members 45 secured to the bars 43 serve to further agitate the feed during mixing. Mounted upon the conveyor power drive shaft 30 are sprocket gears 46 which cooperate with sprocket holes in the conveyor 47. Thus step-by-step rotation of the shaft 30 will cause operation of the conveyor to move the feed rearwardly to the mixers 41 and 42. When the feed is conveyed to the mixers 41 and 42 it is agitated and mixed, and thrown against the hood 48 secured to the rear end of the body to provide still further agitation. The feed then slides down the hood to the distributing pan 38. Figure 5 is a rear view of the carriage showing the hood completely enclosing the rear end of the device.

In operation, feed is added to the carriage from the storage receptacles 7. The desired components of the feed may be added in layers rather than as a mixture, since the feed is mixed during discharge. The carriage is then operated by the operator along the tracks above the feeding trough 5. Power from the motor 12 is conveyed to the transmission 22 and to power shaft 25. From power shaft 25 power is utilized to drive the rotary mixers 41 and 42, and the conveyor 47.

The operator may control the speed of the motor by standard hand clutch means. The friction brake 23 may be applied by foot pedal 25, to provide speed control and accurate stopping means. The rate of discharge can be controlled by the operator by means of the discharge pan 38, the position of which may be adjusted by discharge linkage 40. The conveyor mechanism may be disconnected by the operator by applying tension to the cable 37.

When the discharge pan is in the lowered position and the conveyor mechanism is connected, the feed is conveyed by the conveyor 47 in a step-by-step manner to the upper and lower mixers 41 and 42 where it is thoroughly agitated. The feed is thrown against the hood 48 for further agitation, and then slides down the hood to the discharge pan 38. From the discharge pan the mixed feed falls by gravity into the feeding trough 5. The operator then shifts the transmission into reverse, and returns the carriage to the storage receptacles.

Thus it may be seen that the livestock feeding device receives feed from the storage receptacle, mixes the feed, deposits the feed as it travels on elevated tracks above the trough, and then may be returned to the storage receptacles.

While the preferred embodiment of my invention has been illustrated and described, it will be apparent to those skilled in the art that changes may be made in the form of the apparatus disclosed without departing from the spirit of my invention as set forth in the appended claims, and that in some cases certain features of my invention may be used to advantage without a corresponding use of other features.

What I claim is:

1. Livestock feeding apparatus comprising a feeding trough, tracks supported in an elevationed position above and parallel to said trough, a wheeled substantially-rectangular vehicular feed carriage in rolling contact on said tracks, said carriage having a floor, a front wall, and side walls, means at the rear end of said carriage for mixing feed placed therein, said mixing means comprising an inwardly-curved hood constituting a rear wall of said carriage, said hood extending over and partially covering the rear portion of said carriage and providing an opening between the lower portion of said hood and the rear end of said carriage floor, a pair of substantially-horizontal rotary mixers adjacent the rear end of said carriage and rotatable about their longitudinal axes transverse to the direction of travel of said carriage, one of said mixers being positioned above and forwardly of the other of said mixers to cause said mixers to throw the feed upwardly and rearwardly against the hood, a distributing pan pivotally connected at its upper portion to the lower portion of said hood intermediate said hood lower portion and said carriage floor, said distributing pan having a closed position contiguous with the carriage floor to close the rear carriage opening and a discharge position to guide the mixed feed from the hood through said opening, conveyor means longitudinally arranged adjacent the floor of said carriage, means for driving said conveyor to convey the feed rearwardly to said mixing means in a step-by-step manner, and power means operatively connected to the carriage wheels and to the rotary mixers and the conveyor means to simultaneously propel said carriage and drive said mixing means and said conveyor means whereby the feed is moved rearwardly in the carriage, mixedly thrown against the hood and deposited along the trough as said carriage travels longitudinally thereabove.

2. Livestock apparatus as defined in claim 1 and further including disconnect means associated with said distributing pan and said conveyor means to discontinue operation of said conveyor when said discharge pan is raised to its closed position.

3. Livestock apparatus as defined in claim 2 wherein said conveyor means includes a ratchet mechanism for driving said conveyor in a step-by-step manner, and said disconnect means includes a cam secured to the shaft of one of said rotary mixers, and a follower riding on said cam and operating said ratchet mechanism, said follower being connected to said distributing pan to cause said follower to be removed from contact with said cam when said discharge pan is in its closed position.

References Cited in the file of this patent

UNITED STATES PATENTS

| | | |
|---|---|---|
| 1,138,950 | Henderson | May 11, 1915 |
| 1,613,892 | Itzen | Jan. 11, 1927 |
| 2,601,057 | Roberts et al. | June 17, 1952 |
| 2,659,346 | Paparazzo et al. | Nov. 17, 1953 |
| 2,699,947 | Neighbour et al. | Jan. 18, 1955 |